United States Patent
Randall et al.

(10) Patent No.: US 11,852,118 B2
(45) Date of Patent: Dec. 26, 2023

(54) WIND TURBINE

(71) Applicant: Vestas Wind Systems A/S, Aarhus N (DK)

(72) Inventors: Stephen Randall, Cowes (GB); Andrea Attorni, Cowes (GB); Thomas Potentier, Saint-Mars-du-Désert (FR); Francesco Grasso, Oporto (PT)

(73) Assignee: Vestas Wind Systems A/S, Aarhus N (DK)

( * ) Notice: Subject to any disclaimer, the term of this patent is extended or adjusted under 35 U.S.C. 154(b) by 0 days.

(21) Appl. No.: 18/002,571

(22) PCT Filed: Jun. 29, 2021

(86) PCT No.: PCT/DK2021/050216
§ 371 (c)(1),
(2) Date: Dec. 20, 2022

(87) PCT Pub. No.: WO2022/002334
PCT Pub. Date: Jan. 6, 2022

(65) Prior Publication Data
US 2023/0235723 A1 Jul. 27, 2023

(30) Foreign Application Priority Data
Jun. 29, 2020 (DK) .............................. PA 202070426

(51) Int. Cl.
*F03D 1/06* (2006.01)
(52) U.S. Cl.
CPC .... *F03D 1/0641* (2013.01); *F05B 2240/3042* (2020.08); *F05B 2260/96* (2013.01)
(58) Field of Classification Search
CPC ............... F03D 1/0641; F03D 1/0633; F05B 2240/3042; F05B 2260/96; F05B 2240/304
See application file for complete search history.

(56) References Cited

U.S. PATENT DOCUMENTS 5,088,665 A * 2/1992 Vijgen ................ F03D 1/0675
244/215
7,059,833 B2 * 6/2006 Stiesdal ................ F03D 80/00
29/889.6

(Continued)

FOREIGN PATENT DOCUMENTS

EP 2128435 A2 12/2009
EP 3348825 A1 7/2018
(Continued)

OTHER PUBLICATIONS

International Searching Authority, International Search Report and Written Opinion issued in corresponding PCT Application No. PCT/DK2021/050216, dated Sep. 28, 2021.
(Continued)

*Primary Examiner* — Eldon T Brockman
(74) *Attorney, Agent, or Firm* — Wood Herron & Evans LLP (57) ABSTRACT

A horizontal axis wind turbine comprising a rotor having a plurality of blades, the rotor having a radius R of at least 80 meters, the blades comprising: a root end and a tip end, the blades extending in a spanwise direction from the root end to the tip end; a leading edge and a trailing edge, the blades extending in a chordwise direction along a chord from the leading edge to the trailing edge; a shoulder between the root end and the tip end where a chord length defined between the leading edge and the trailing edge is at a maximum; the blades being twisted between the root end and the tip end and the twist is defined by a twist distribution curve along the spanwise direction of the blades, each blade further comprising: an inboard region between the root end of the blade and the shoulder of the blade; an outboard region between a rotor radius 0.9R and the tip end of the blade; and a mid-board region located between the inboard region and the outboard region; a noise reduction feature in the mid- (Continued)

board region of the blade, the noise reduction feature projecting from the trailing edge and extending from a first radial position R1 toward the tip end; wherein the twist distribution curve comprises a first inflection point in the vicinity of the first radial position R1.

21 Claims, 5 Drawing Sheets (56) References Cited

U.S. PATENT DOCUMENTS

| | | | |
|---|---|---|---|
| 8,523,515 B2* | 9/2013 | Drobietz | F03D 1/0675 |
| | | | 416/228 |
| 9,611,833 B2* | 4/2017 | Madsen | F03D 1/0633 |
| 9,617,974 B2 | 4/2017 | Singh | |
| 11,661,918 B2* | 5/2023 | León | F03D 7/0296 |
| | | | 416/228 |
| 2003/0099546 A1* | 5/2003 | Stiesdal | F03D 1/0641 |
| | | | 416/228 |
| 2011/0142666 A1* | 6/2011 | Drobietz | F03D 1/0675 |
| | | | 416/228 |
| 2013/0115098 A1* | 5/2013 | Madsen | F03D 1/0641 |
| | | | 416/241 R |
| 2013/0195670 A1 | 8/2013 | Bjertrup Nielsen et al. | |
| 2013/0280085 A1* | 10/2013 | Koegler | F03D 1/0633 |
| | | | 416/228 |
| 2014/0072441 A1* | 3/2014 | Asheim | F03D 1/0633 |
| | | | 416/241 R |
| 2014/0286784 A1* | 9/2014 | Singh | F03D 1/0675 |
| | | | 416/228 |
| 2020/0063709 A1 | 2/2020 | Carroll et al. | |
| 2022/0163012 A1* | 5/2022 | León | F03D 1/0675 |
| 2022/0186705 A1* | 6/2022 | Kamruzzaman | F03D 1/0608 |

FOREIGN PATENT DOCUMENTS

| | | |
|---|---|---|
| WO | 2018046067 A1 | 3/2018 |
| WO | 2019210330 A1 | 10/2019 |

OTHER PUBLICATIONS

Danish Patent and Trademark Office, Examination Report issued in corresponding DK Application No. PA 202070426, dated Dec. 16, 2020.

* cited by examiner

WIND TURBINE

TECHNICAL FIELD

The present invention relates to a horizontal axis wind turbine comprising a rotor having a plurality of blades. In particular, the invention relates to particular geometries of the blade to reduce aerodynamic noise generated by the rotor.

BACKGROUND

Wind turbines are used to convert kinetic energy from the wind into electrical power. In recent years, wind power has become a more attractive alternative energy source and the number of wind turbines, wind farms, etc. has significantly increased, both on land and off-shore. Traditionally, wind turbines have been located in relatively remote areas where noise from the wind turbine has not been significantly problematic. However, as the number of wind turbines increases, the noise generated thereby has been receiving more attention. In this regard, wind turbines are being located closer to business and residential areas that may have various laws and regulations restricting noise levels.

There are two primary sources of noise for a wind turbine: mechanical noise and aerodynamic noise. Mechanical noise may be from the various wind turbine components, such as the gearbox, generator, pitch and yaw controls, hydraulic systems, etc. Aerodynamic noise, on the other hand, may be due to the interaction between the blade and the air flowing over the blade. While mechanical noise can be a significant contributor to overall wind turbine noise, there are some known techniques for reducing mechanical noise, including using vibration dampers and sound absorbing materials. In contrast, aerodynamic noise may be difficult to mitigate and is believed to be the primary source for wind turbine noise. As wind turbines continue to increase in size, the tip speed of the blade also increase. As the tip speed increases, so to does the aerodynamic noise.

There may be several sources for aerodynamic noise, including trailing edge noise and blade tip vortex noise. Trailing edge noise, which may include blunt trailing edge vortex-shedding noise and turbulent boundary layer trailing edge noise, has received some attention by power producers and manufacturers. For example, various trailing edge designs, such as serrated or sawtooth designs, have been used for reducing trailing edge noise. While such solutions for trailing edge noise are known in the art, the serrated or sawtooth designs can only mitigate the noise to a certain extent and they may impact on the aerodynamic performance of the blade.

Accordingly, it is an aim of the present invention to provide a wind turbine rotor which has reduced aerodynamic noise.

SUMMARY OF INVENTION

According to the present invention there is provided a horizontal axis wind turbine comprising a rotor having a plurality of blades, the rotor having a radius R of at least 80 meters, the blades comprising:
- a root end and a tip end, the blades extending in a spanwise direction from the root end to the tip end;
- a leading edge and a trailing edge, the blades extending in a chordwise direction along a chord from the leading edge to the trailing edge;
- a shoulder between the root end and the tip end where a chord length defined between the leading edge and the trailing edge is at a maximum;
- the blades being twisted between the root end and the tip end and the twist is defined by a twist distribution curve along the spanwise direction of the blades, each blade further comprising:
- an inboard region between the root end of the blade and the shoulder of the blade;
- an outboard region between a rotor radius 0.9R and the tip end of the blade;
- and a mid-board region located between the inboard region and the outboard region;
- a noise reduction feature in the mid-board region of the blade, the noise reduction feature projecting from the trailing edge and extending from a first radial position R1 toward the tip end;
- wherein the twist distribution curve comprises a first inflection point in the vicinity of the first radial position R1.

The wind turbine blade is twisted along the spanwise direction to account for the fact that in operation the outboard region of the wind turbine blade moves faster than the inboard region of the wind turbine blade. This results in the twist distribution along the spanwise length of the blade.

In the mid-board region of the blade, the twist decreases towards the tip of the blade to maintain a relatively constant angle of attack along the blade, the angle of attack being the angle between the blade chord and the relative wind direction. According to the present disclosure when the twist "decreases" the leading edge of the blade is rotated upwards to increase the local angle of attack. At the inflection point on the twist distribution curve, the second derivate of the twist distribution is zero.

The position of the first inflection point corresponds with the start of the noise reduction feature at radial position R1. In use, the noise reduction feature at the trailing edge may reduce the aerodynamic performance of the blade. In particular, the noise reduction feature may reduce the lift and/or increase the drag generated by the blade at the radial position where the noise reduction feature is positioned. To compensate for this loss of lift, the inflection point in the twist distribution curve provides a decrease in twist angle and an increase in angle of attack. The increase in angle of attack will compensate for this loss of lift from the noise reduction feature.

Preferably, the noise reduction feature comprises a serrated trailing edge. A serrated trailing edge comprises a sawtooth like shape which acts to reduce trailing edge noise.

Preferably, the twist decreases in the mid-board region of the blade toward the outboard region. The reduction in twist provides a suitable angle of attack along the length of the blade.

When the twist distribution comprises a first inflection point in the vicinity of the first radial position, the first inflection point may be less than 15% of the rotor radius from the first radial position, preferably less than 10% and more preferably less than 5%. Preferably, the first inflection point is located rootward of the first radial position. This allows the blade to be set at the desired twist angle where the noise reduction feature starts.

Preferably, the twist distribution curve comprises a second inflection point located between the first inflection point and the tip end.

The first radial position R1 may be located between 0.6 R and 0.8 R. In particular, the first radial position R1 may be located at approximately 0.7 R. Using a noise reduction feature, such as a serrated trailing edge, only in the outer third of the blade is advantageous because this location is the dominant source of aerodynamic noise.

The horizontal axis wind turbine may comprise a rotor wherein:

$Sol_r$ is at least 0.0140 at 0.7 R;
$Sol_r$ is at least 0.0116 at 0.8 R;
$Sol_r$ is at least 0.0090 at 0.9 R;
$Sol_r$ being the combined radius specific solidity of the blades and is defined by:

$$Sol_r = \frac{n \cdot c_r}{2\pi R}$$

where n=the number of blades, $C_r$=the chord length at the specific radius and R=the rotor radius.

The solidity of a wind turbine blade is the ratio between the area of the wind turbine blade ($A_{blade}$) projected into the rotor plane and the total area covered by the rotating blades, $\pi R^2$. The combined solidity, i.e. the sum of solidities of the blades is hence:

$$Sol = \frac{n \cdot A_{blade}}{\pi R^2}$$

Where n is the number of wind turbine blades (for example 3) and R is the rotor radius. The solidity is therefore a measure of the slimness of the blade in that the lower the solidity, the slimmer the blades.

Solidity may also be established for a specific radius r, from the rotor centre. The radius specific solidity of the wind turbine rotor (i.e. the combined radius specific solidity of the blades) is given by (where $C_r$ is the chord at the specific radius):

$$Sol_r = \frac{n \cdot c_r}{2\pi R}$$

It is known in the design of wind turbine blades that reducing the solidity of wind turbine blades decreases the loads on the wind turbine. This is because a reduced solidity results in a smaller chord and hence reduced fatigue and extreme loading on the wind turbine blades. (This is described in WO2006/090215 for example.) However, this invention does not aim for more slender blades, but instead for higher solidity values in an outer half of the blades.

The power generated by a wind turbine is proportional to the rotational speed of the rotor. As blade lengths increase, the tip speed of the blades will also increase for a given rotational speed. However, an increased tip speed results in higher aerodynamic noise. In addition, higher tip speeds result in increased erosion of the leading edge of the wind turbine blade. By providing the wind turbine rotor having the combined radius specific solidity as set out above, the tip speed can be reduced without a corresponding reduction in the lift force generated by the blades. In addition, due to the lower tip speed the aerodynamic noise is reduced. Typically, for a conventional rotor, if the tip speed were to be reduced by lowering the rotational speed, there would be a corresponding drop in the power generated by the wind turbine as there would be a lower lift force produced by the blades.

With the solidity values set out above, the blades have a larger chord in at least the outer 30% of the span compared to a conventional blade. As the chord is relatively larger, the blades in this outer 30% will generate more lift. Therefore, the tip speed can be reduced. In addition, due to the increased chord in the outer 30% of the blade, the blade can be operated at a reduced angle of attack while still generating sufficient lift. A reduced angle of attack at which the blade sections operate also means a reduction in aerodynamic noise. This is because the boundary layer across the blade will be thinner.

For long rotor blades, particularly those over 80 meters in length, the aerodynamic noise becomes a limiting factor in the design. The blade geometry defined here advantageously allows for a reduction in the aerodynamic noise while still providing sufficient aerodynamic performance.

Preferably, $Sol_r$ is at least 0.0164 at 0.6 R. Preferably, $Sol_r$ is at least 0.0199 at 0.5 R. By providing increased solidity values further inboard the noise generated by the blade can be reduced further, while still maintaining the aerodynamic performance.

In a preferred embodiment, the blades have a combined radius specific solidity whereby:

$Sol_r$ is at least 0.0146 at 0.7 R;
$Sol_r$ is at least 0.0123 at 0.8 R;
$Sol_r$ is at least 0.0099 at 0.9 R.

Such solidity values are especially beneficial for wind turbines having a rotor radius over 80 meters, such as over 90 meters.

$Sol_r$ may be at least 0.0172 at 0.6 R; and $Sol_r$ may be at least 0.0200 at 0.5 R. For long wind turbine blades (where the rotor radius is over 80 meters) such solidity values allow the tip speed of the rotor to be reduced while still maintaining the aerodynamic performance.

In a preferred embodiment, the blades have a combined radius specific solidity whereby:

$Sol_r$ is below 0.0164 at 0.7 R;
$Sol_r$ is below 0.0133 at 0.8 R;
$Sol_r$ is below 0.0108 at 0.9 R.

While an increased chord in the outer 30% leads to a reduction of noise, the combined radius specific solidity is preferably below these values such that fatigue and extreme loads on the rotor are not too high.

Preferably, the shoulder is located at a position between 0.18 R and 0.35 R, preferably between 0.2 R and 0.3 R.

At the shoulder position the combined radius specific solidity of the blades, $Sol_r$, may be less than 0.027 and may preferably be less than 0.026.

A ratio defined as:

$$\frac{Sol_r\_0.7R}{Sol_r\_shoulder}$$

may be greater than 0.5 and preferably greater than 0.55, and even more preferably greater than 0.58; wherein said ratio is the combined radius specific solidity of the blades at 0.7 R to the combined radius specific solidity of the blades at the shoulder of the blades.

The increased rotor solidity in the outer 30% (and preferably outer half) of the blades may result in higher loads, due to the increase in chord length in comparison to a conventional blade. In particular, the extreme loads that the wind turbine experiences may be increased. But, providing the rotor with a relatively low rotor solidity at the shoulder of the blades can mitigate against these increased loads and help to protect the wind turbine from damage It should be noted that the plurality of blades are preferably substantially identical in terms of their external geometry so that the shoulder on each blade will be at the same position and have the same chord length.

By the expression "at the shoulder position" means that the radius specific solidity of the blades is determined at the position of maximum chord of the blades. The shoulder of the blade may not be a sharp point and so the expression "at the shoulder position" can be interpreted as at the shoulder position +/−1% R.

Preferably, the design Reynolds number at the tip of the blades is at least $1.1 \times 10^6$ and more preferably at least $1.2 \times 10^6$. The design Reynolds number at a maximum chord position on the blade may be at least $9 \times 10^6$ and preferably at least $10 \times 10^6$.

As is well known in the art, the lift and drag coefficients on an airfoil or blade are dependent on the Reynolds number. The Reynolds number is defined as:

$$Re = \frac{\rho w c_r}{\mu}$$

Where w is the relative wind speed at a blade section, $\rho$ is the density of air and $\mu$ is the dynamic viscosity of air. For a local blade section, the Reynolds number will vary dependent on the chord length $C_r$.

The size of wind turbine blades can be described in terms of length. But, they can also be described with reference to a Reynolds number and a longer blade will lead to a higher Reynolds number. The solidity values of the present invention are particularly suitable to wind turbine blades that operate at the aforementioned Reynolds numbers. The Reynolds numbers provided here are the "design Reynolds numbers" which are taken at the design point of the wind turbine. The design point is when the rotor is operating at its optimum tip speed ratio as is understood by the person skilled in the art. The values for the density of air and the dynamic viscosity of air are taken to be at sea level.

BRIEF DESCRIPTION OF THE DRAWINGS

In order that the present invention may be more readily understood, examples of the invention will now be described, by way of example only, and with reference to the following Figures, in which.

DETAILED DESCRIPTION OF THE INVENTION

Figure 1:
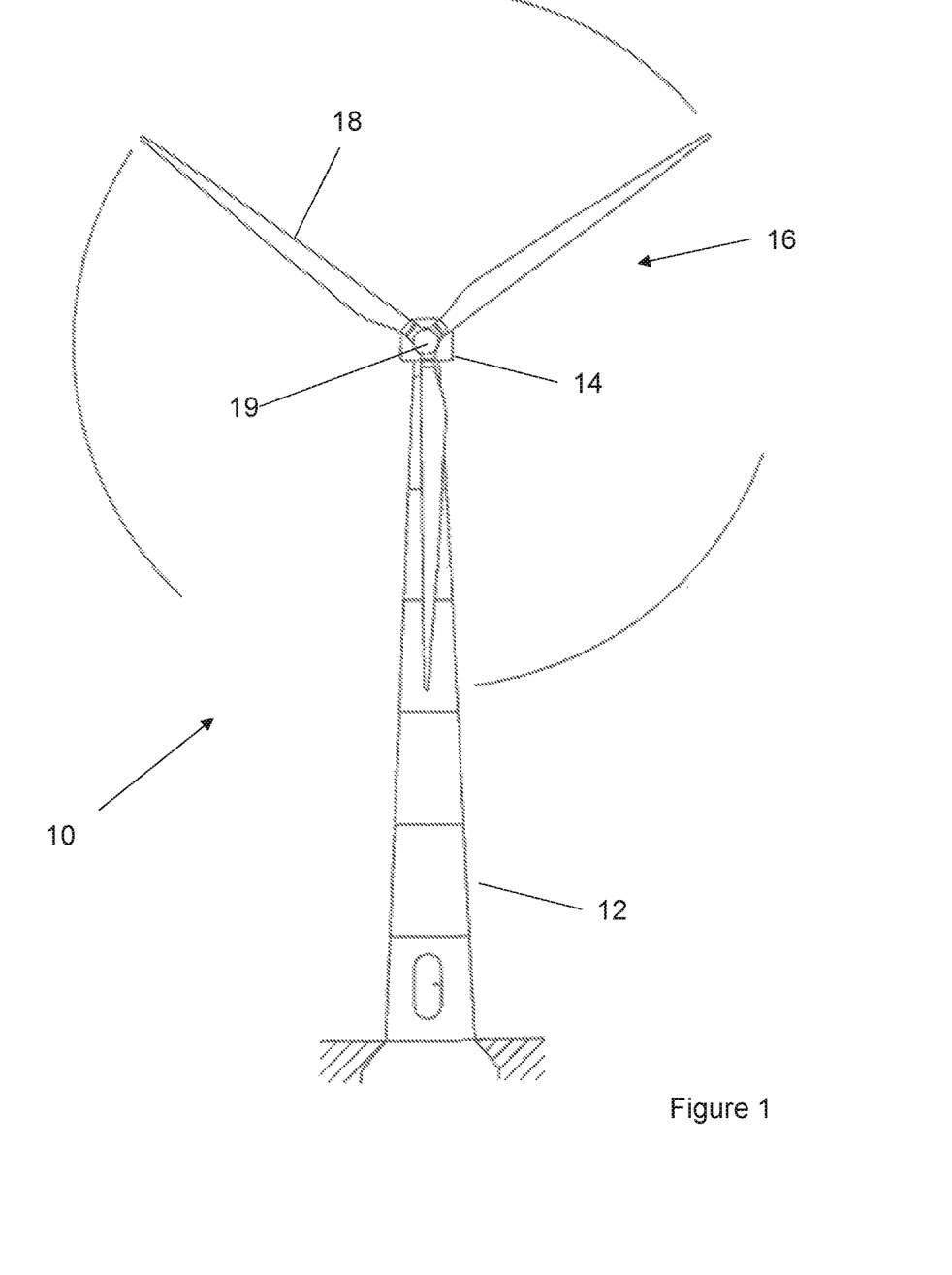
FIG. 1 is a view of a horizontal axis wind turbine.

FIG. 1 shows a horizontal axis wind turbine 10. The wind turbine 10 comprises a tower 12 supporting a nacelle 14 to which a rotor 16 is mounted. The rotor 16 comprises a plurality of wind turbine blades 18 that extend radially from a central hub 19. In this example, the rotor 16 comprises three blades 18.

Figures 2A, 2B:
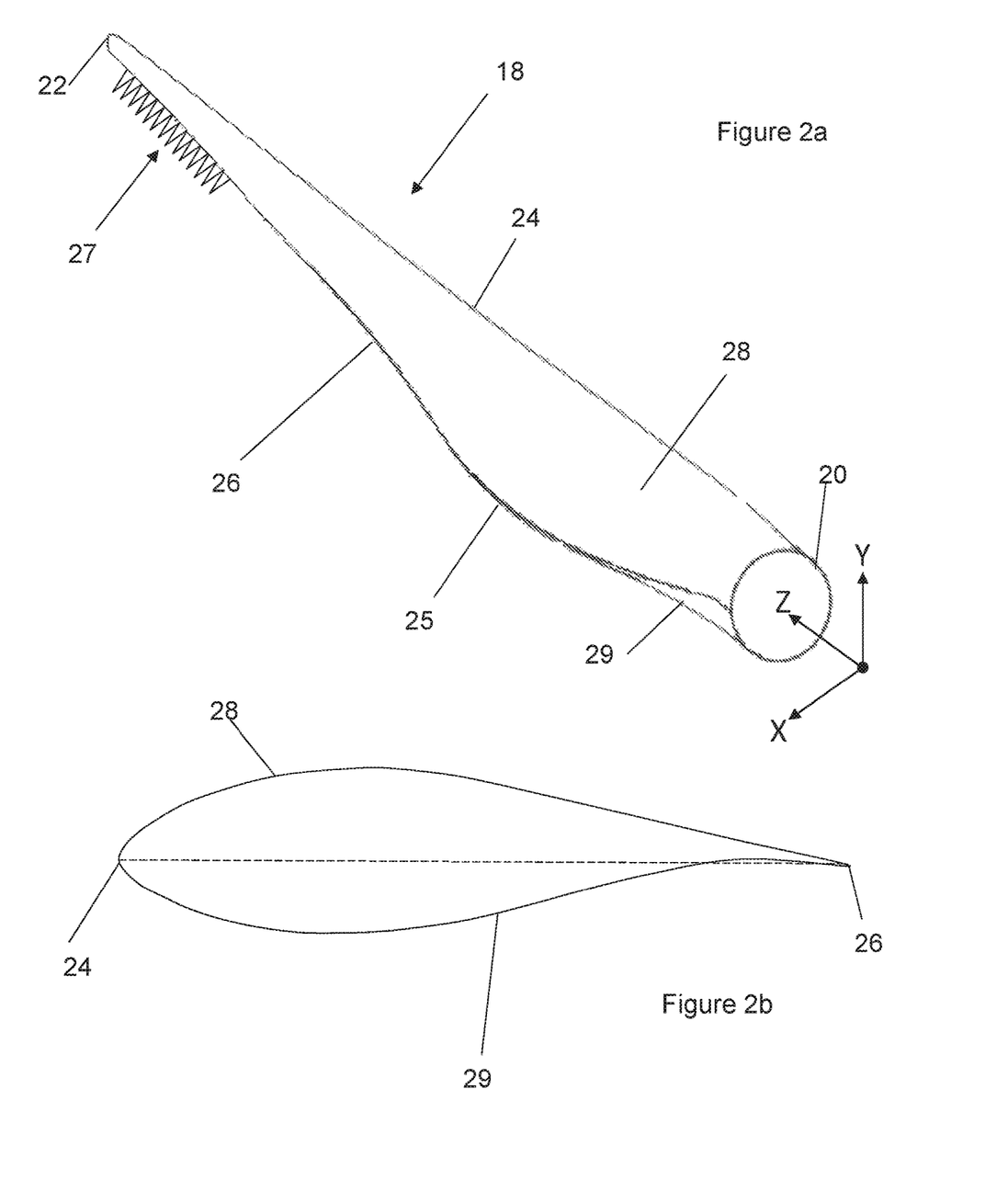
FIG. 2a is a perspective view of a wind turbine blade and FIG. 2b is a cross section through the wind turbine blade.

FIG. 2a is a view of one of the blades 18 of the wind turbine 10. The blade 18 extends from a generally circular root end 20 to a tip end 22 in a longitudinal spanwise direction, and between a leading edge 24 and a trailing edge 26 in a transverse chordwise direction. The blade 18 comprises a shell formed primarily of fibre-reinforced plastic (FRP). The blade 18 comprises a suction surface 28 and a pressure surface 29. The rotor 16 has a radius such that the tip ends of the blades are at position r=R and the axis of rotation is at r=0.

The blade 18 transitions from a circular profile to an airfoil profile moving from the root end 20 of the blade 18 towards a shoulder 25 of the blade 18, which is the widest part of the blade 18 where the blade 18 has its maximum chord. The blade 18 has an airfoil profile of progressively decreasing thickness from the shoulder towards the tip end of the blade.

The wind turbine blade 18 comprises an inboard region between the root end of the blade and the shoulder 25 of the blade; a tip region between a rotor radius 0.9 R and the tip end of the blade; and a mid-board region located between the inboard region and the tip region.

FIG. 2b is an illustration of an airfoil profile of the wind turbine blade in the mid-board blade region. A chord line connects the leading edge 24 and the trailing edge 26.

FIG. 2a shows that the blade may comprise a noise reduction feature 27 which in this example is a serrated trailing edge. The serrations serve to reduce noise caused by the blade 18 in use. In an example, the serrations are provided as an add-on component which is adhesively bonded to the blade at the trailing edge, and may be formed from injection moulded plastic for instance. The serrations which are in the form of triangles, e.g. a saw tooth shape, are understood to reduce aerodynamic trailing edge noise through interaction with a turbulent boundary layer which flows over the blade surface. In another example, the noise reduction feature may comprise bristles and/or combs extending from the trailing edge.

The noise reduction feature may only cover a given length of the blade span, particularly towards the tip where the trailing edge noise is most dominant. The noise reduction feature starts at a radial location R1 and extends towards the tip of the blade. In an example, the radial location R1 may be at 0.7 R. In particular, the noise reduction feature has a proximal end (nearest to the root end 20 of the blade) that is located in the mid-board region of the blade.

Referring to FIG. 2a, a blade coordinate system may be defined. The origin of the coordinate system is aligned with the rotational axis of the rotor at r=0. The X-axis extends parallel to the rotor axis. The Z-axis extends along a pitch axis of the blade, which in the example of FIG. 2a is aligned with the spanwise direction of the blade. The Y-axis is perpendicular to the X-axis and the Z-axis.

As is well known in the art, a wind turbine rotor blade can rotate about a pitch axis in order to regulate the power output of the wind turbine and the loads experienced by the wind turbine components. In the case of a wind turbine where the blades have no coning and no prebend, the blade spanwise axis is aligned with the pitch axis. In this case, the blades will pitch about the Z-axis. However, if the blades have either prebend or coning, the pitch axis is not coincident with the blade spanwise axis.

Figure 3:
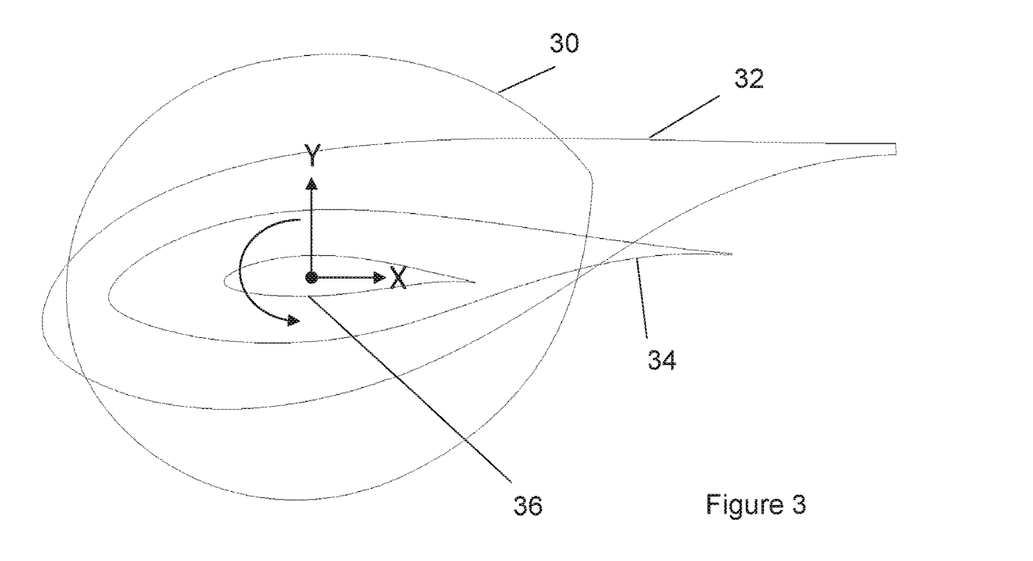
FIG. 3 shows cross sections along the span of a blade.

The airfoil profile of the wind turbine blade is twisted along the spanwise direction to account for the fact that, in operation, the outboard region of the wind turbine blade moves faster than the inboard region of the wind turbine blade. As the blade twists along its length, the chordline rotates arounds the spanwise axis of the blade. As can be seen in FIG. 3, cross sections of the blade are taken along the length of the blade. The cross section profiles are adjacent to the root (profile 30), 0.25 R (profile 32), 0.5 R (profile 34) and at 0.95 R (profile 36). The twist angle of each of the profiles is shown in FIG. 3 and as can be seen in this example the twist angle generally decreases from the root of the blade to the tip of the blade.

As shown in FIG. 3 the twist involves rotation of the blade about the spanwise or Z axis. When the blade is twisted such that leading edge points down, as indicated by the curved arrow in FIG. 3, the twist is increasing and conversely when the twist is decreasing the leading edge is being raised. A twist angle represents the angle between a local chord and the plane of rotation of the rotor.

Figure 4:
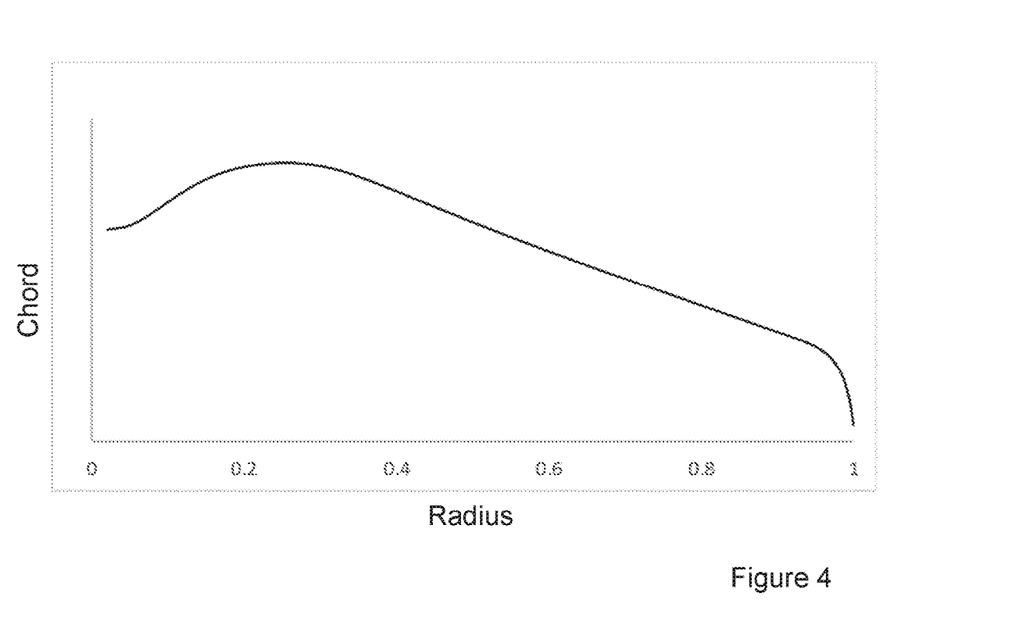
FIG. 4 shows the chord distribution of a blade.

FIG. 4 shows the chord distribution of a blade along its spanwise length. In this Figure, the X axis represents the radius and the Y axis represents the chord length. As can be seen the chord length initially increases until the shoulder of the blade and then it decreases towards the tip of the blade. As will be appreciated, for a given number of blades the radius specific solidity ($Sol_r$) is directly proportional to the local chord length on the blade.

Figure 5:
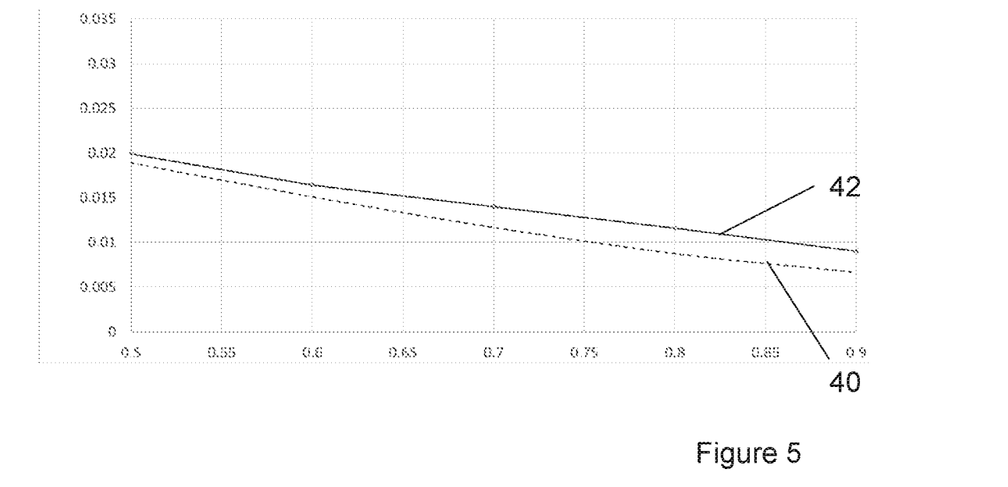
FIGS. 5 and 6 show the radius specific solidity of two blades.

FIG. 5 illustrates the combined radius specific solidity ($Sol_r$) of an outer half of a rotor with improved blades in comparison with conventional blades. The X axis represents the distance along the blade in terms of radius. The radius specific solidity values are shown on the Y axis. The dashed line 40 represents a rotor with conventional blades, and the solid line 42 represents a rotor with improved blades having higher radius specific solidity values.

The chart shown in FIG. 5 extends to 90% radius of the rotor. The last 10% of the rotor radius has not been included because at the tip region the chord length may rapidly decrease to zero.

The rotor with the improved blades shown in FIG. 5 has the following combined radius specific solidity values:

$Sol_r$ is 0.0140 at 0.7 R;
$Sol_r$ is 0.0116 at 0.8 R;
$Sol_r$ is 0.0090 at 0.9 R.

As discussed above, $Sol_r$ is the combined radius specific solidity of the blades and is defined by:

$$Sol_r = \frac{n \cdot c_r}{2\pi R}$$

where n=the number of blades, $C_r$=the chord length at the specific radius and R=the rotor radius.

When these solidity values are used in combination with a rotor having a radius of at least 80 m there are a number of advantages in comparison to a conventional blade. In particular, the higher solidity values (which arise from increased chord lengths in the outer 30% of the blade) means that this part of the blade will generate more lift so that the tip speed of the rotor can be reduced. The operating angle of attack of the rotor blade can also be reduced which will lead to a reduction in aerodynamic noise.

Figure 6:
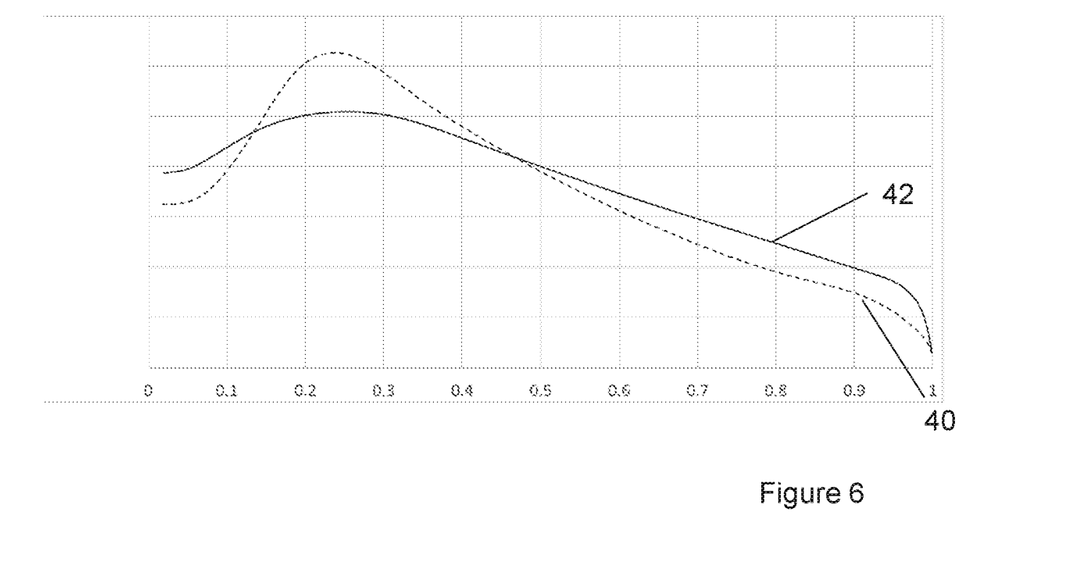

FIG. 6 shows the improved blade (represented by solid line 42) compared to a conventional blade (represented by the dashed line 40) with radius on the X axis and radius specific solidity values on the Y axis. As can be seen on the improved blade the solidity value at the shoulder of the blade (where the chord is at a maximum) is lower than the solidity of the conventional blade. This feature, in combination with the improved blade having a higher solidity in at least the outer 30% of the blade, helps to reduce the extreme loads experienced by the blade in use because the chord length at the shoulder is reduced.

At the shoulder position the combined radius specific solidity of the blades, $Sol_r$, may be less than 0.027 and may preferably be less than 0.026.

The increased rotor solidity in at least the outer 30% of the blades may result in higher loads, due to the increase in chord length in comparison to a conventional blade. In particular, the extreme loads that the wind turbine experiences may be increased. But, providing the rotor with a relatively low rotor solidity at the shoulder of the blades can mitigate against these increased loads and help to protect the wind turbine from damage In particular, a ratio of the combined radius specific solidity of the blades at 0.7 R to the combined radius specific solidity of the blades at the shoulder of the blades is greater than 0.5 and preferably greater that 0.55.

Figure 7:
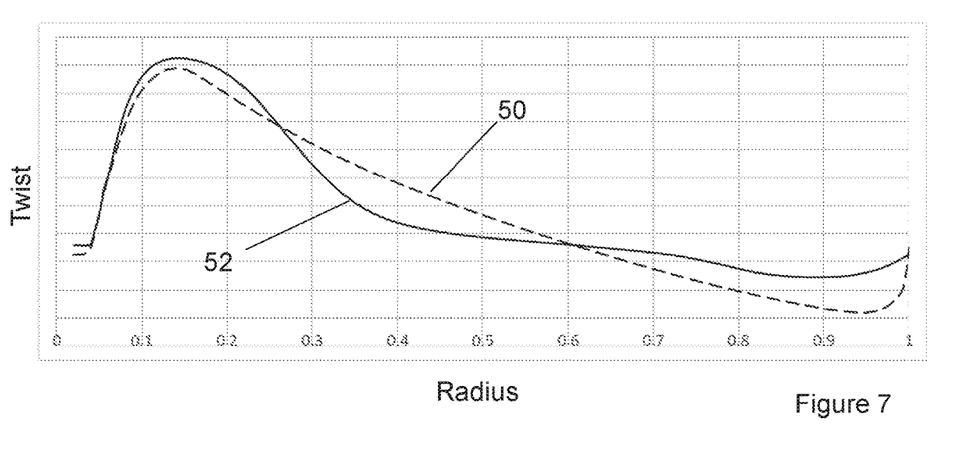
FIGS. 7 and 8 show the twist distribution of blades.

As mentioned above with respect to FIG. 3, a twist angle of the blade reduces in the direction towards the tip of the blade. FIG. 7 shows a twist distribution for a conventional blade identified by the dashed line 50. A twist distribution for an improved blade is identified by line 52. As is standard in the art the twist initially increases in the root region of the blade for structural reasons before reducing towards the tip. The blade twist is necessary as the effective flow at the blade in use comprises the rotor rotational speed and the oncoming wind speed. As the peripheral speed of the blades increase along the blade span, the angle of attack of a blade section also varies along the blade span. To maintain the angle of attack and the lift force along the blade, the blade therefore has a twist distribution from the root to the tip.

The tip of the blade is also "de-twisted" in order to reduce the induced drag from the tip of the blades. This is shown in FIG. 7 starting at approximately 0.95 R, but this feature is not relevant to the present disclosure.

When comparing the conventional twist distribution line 50 with the improved twist distribution line 52 in FIG. 7, it can be seen that there is a "bump" in the twist distribution line at around 0.7 R. This feature is enlarged and exaggerated for clarity in FIG. 8.

Figure 8:
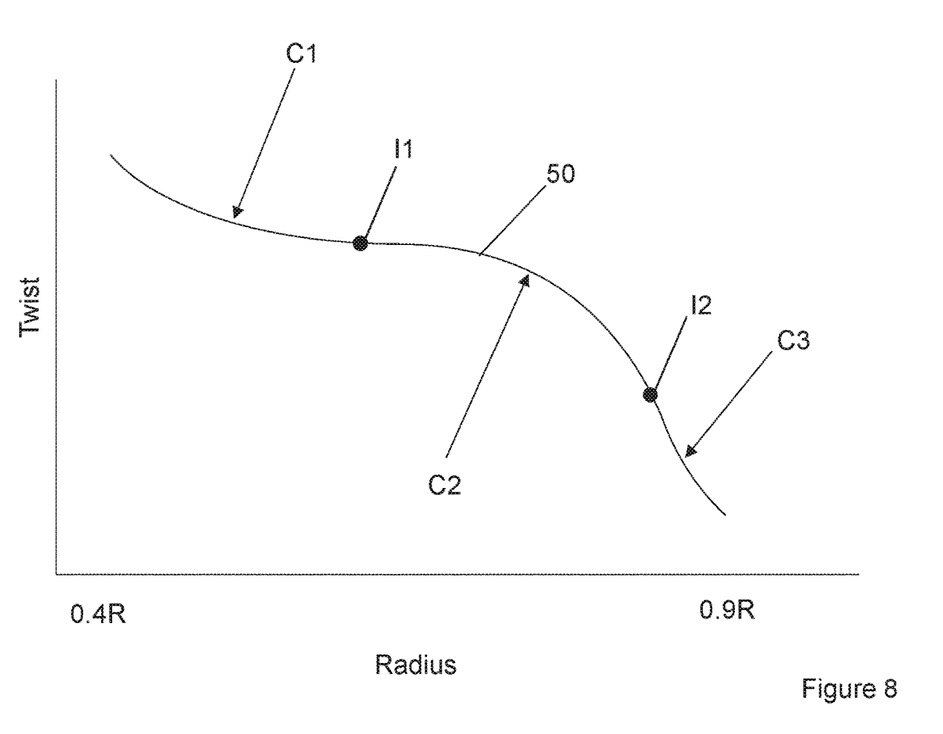

In the twist distribution shown in FIG. 8, when moving from the mid-board region towards the tip there is a first concave region C1, a convex region C2 and a second concave region C3. The terms "concave" and "convex" are purely used for convenience and are seen from a view point above the twist distribution line in FIG. 8. A conventional twist distribution curve in this region (e.g. from 0.4 R to 0.9 R) has a purely concave shape.

The first and second concave regions C1 and C3 are defined by the slope of the twist distribution having a positive second derivative. The convex region C2 is defined by the slope of the twist distribution having a negative second derivative.

The concave regions C1 and C3 join the convex region C2 at a first inflection point 11 and a second inflection point 12, respectively. At the inflection points the second derivative of the twist distribution is zero.

The position of the first inflection point 11 corresponds with the start of the noise reduction feature 27 at radial position R1 (the "start" of the noise reduction feature being the proximal end nearest to the root of the blade 18). While the noise reductions feature 27 at the trailing edge acts to reduce the trailing edge, there may be a negative effect on the aerodynamic performance. In particular, the noise reduction feature may reduce the lift and/or increase the drag generated by the blade at the radial position where the noise reduction feature is positioned. To compensate for this loss of lift, the improved blade exhibits the "bump" in the twist distribution as just described. In particular, the twist value is reduced so that the leading edge of the airfoil is rotated upward. Rotating the airfoil section in this direction will increase the local angle of attack and thus increase the lift generated by the blade at that radial location.

Expressed another way, the twist angle is lowered in the vicinity of the noise reduction feature to place that part of the blade at a higher angle of attack to compensate for the lift reduction caused by the noise reduction feature. The twist angle is lowered such that the gradient of the twist distribution curve becomes steeper in the vicinity of the noise reduction feature, when moving towards the tip.

In an example, the noise reduction feature is a serrated trailing edge 27 which starts at a radial location 0.7 R. To have an effective reduction in twist at the serrated trailing edge, the first inflection point 11 will be located rootward of the radial location 0.7 R. For example, the first inflection point 11 may be located at 0.65 R.

More generally, the first inflection point 11 is in the vicinity of the radial location R1 where the noise reduction feature starts. For example, the inflection point is less than 15% of the rotor radius from R1, preferably less than 10% and more preferably less than 5%.

After the first inflection point 11 when moving towards the tip there is a second inflection point 12. The purpose of the second inflection point is to raise the twist angle so that the angle of attack will be reduced towards the tip.

As has been described, an improved rotor according to the invention may exhibit the following features when compared to a conventional blade:

The combined radius specific solidity of the blades is increased in at least an outer part of the blades, particularly the last third of the blades. This is achieved by a bigger chord which allows the tip speed to be reduced and the local angle of attack to be reduced, both of which lead to a reduction in noise.

When the blade is fitted with a noise reduction feature at the trailing edge, an inflection point in the twist distribution provides a change in the local angle of attack to compensate for a loss of aerodynamic performance caused by the noise reduction feature.

These features may be used alone, or in combination. When these features are used in combination the increased solidity provides a larger chord in the outer part of the blade. This means that the angle of attack can be reduced and so the local blade section is twisted so that the leading edge is rotated downwards (i.e. the twist angle is increased). This can be seen in FIG. 7 where the improved blade (illustrated by solid line 50) has a greater twist angle after approximately 0.6 R. Advantageously, as the twist angle is higher (compared to a conventional blade) there is therefore capacity to reduce the twist to compensate for a loss of aerodynamic performance caused by the noise reduction feature.

Referring to FIG. 7, in the first half of the blade the twist angle of the improved blade (line 52) is lower than the twist angle of the conventional blade (line 50). As discussed, a lower twist translates to a higher angle of attack, and as can be seen from FIG. 6 the improved blade (line 42) generally has a reduced chord length compared to a conventional blade (line 40) in this blade region. As noted previously, smaller chord lengths in the area around the shoulder of the blade can be used to reduce extreme loads experienced by the blade in use.

When the twist "decreases" the leading edge of the blade is rotated upwards to increase the local angle of attack. However, this is purely a convention and it is possible that the twist could be measured in the opposite sense, so that when the twist decreases the leading edge is rotated downwards. In the present disclosure, the twist is defined as decreasing when the leading edge of the blade is rotated upwards.

Many modifications may be made to the examples described above without departing from the scope of the present invention as defined in the accompanying claims.

The invention claimed is:

1. A horizontal axis wind turbine comprising a rotor having a plurality of blades, the rotor having a radius R of at least 80 meters, the blades comprising:
   a root end and a tip end, the blades extending in a spanwise direction from the root end to the tip end;
   a leading edge and a trailing edge, the blades extending in a chordwise direction along a chord from the leading edge to the trailing edge;
   a shoulder between the root end and the tip end where a chord length defined between the leading edge and the trailing edge is at a maximum;
   the blades being twisted between the root end and the tip end and the twist is defined by a twist distribution curve along the spanwise direction of the blades, each blade further comprising:
   an inboard region between the root end of the blade and the shoulder of the blade;
   an outboard region between a rotor radius 0.9R and the tip end of the blade;
   and a mid-board region located between the inboard region and the outboard region;
   a noise reduction feature in the mid-board region of the blade, the noise reduction feature projecting from the trailing edge and extending from a first radial position R1 toward the tip end;
   wherein the twist distribution curve comprises a first inflection point in the vicinity of the first radial position R1.

2. The wind turbine according to claim 1, wherein the noise reduction feature comprises a serrated trailing edge.

3. The wind turbine according to claim 1, wherein the twist decreases in the mid-board region of the blade toward the outboard region.

4. The wind turbine according to claim 1, wherein when the twist distribution comprises a first inflection point in the vicinity of the first radial position, the first inflection point is less than 15% of the rotor radius from the first radial position.

5. The wind turbine according to claim 4, wherein when the twist distribution comprises a first inflection point in the vicinity of the first radial position, the first inflection point is less than 10% of the rotor radius from the first radial position.

6. The wind turbine according to claim 4, wherein when the twist distribution comprises a first inflection point in the vicinity of the first radial position, the first inflection point is less than 5% of the rotor radius from the first radial position.

7. The wind turbine according to claim 1, wherein the twist distribution curve comprises a second inflection point located between the first inflection point and the tip end.

8. The wind turbine according to claim 1, wherein the first radial position R1 is located between 0.6R and 0.8R.

9. The wind turbine according to claim 1, wherein:
$Sol_r$ is at least 0.0140 at 0.7R;
$Sol_r$ is at least 0.0116 at 0.8R;
$Sol_r$ is at least 0.0090 at 0.9R;
$Sol_r$ being the combined radius specific solidity of the blades and is defined by:

$$Sol_r = \frac{n \cdot c_r}{2\pi R}$$

where n=the number of blades, $C_r$=the chord length at the specific radius and R=the rotor radius.

10. The wind turbine according to claim 9, wherein:
$Sol_r$ is at least 0.0164 at 0.6R.

11. The wind turbine according to claim 7, wherein:
$Sol_r$ is at least 0.0199 at 0.5R.

12. The wind turbine according to claim 9, wherein:
$Sol_r$ is at least 0.0146 at 0.7R;
$Sol_r$ is at least 0.0123 at 0.8R;
$Sol_r$ is at least 0.0099 at 0.9R.

13. The wind turbine according to claim 9 wherein $Sol_r$ is at least 0.0172 at 0.6R.

14. The wind turbine according to claim 9 wherein $Sol_r$ is at least 0.0200 at 0.5R.

15. The wind turbine according to claim 9 wherein at the shoulder position a combined radius specific solidity of the blades, $Sol_r$, is less than 0.027.

16. The wind turbine according to claim 15 wherein at the shoulder position a combined radius specific solidity of the blades, $Sol_r$, is less than 0.026.

17. The wind turbine according to claim 9 wherein a ratio $$\frac{Sol_r\_0.7R}{Sol_r\_shoulder}$$

is greater than 0.5 and preferably greater than 0.55;
wherein said ratio is the combined radius specific solidity of the blades at 0.7R to the combined radius specific solidity of the blades at the shoulder of the blades.

18. The wind turbine according to claim 1, wherein the design Reynolds number at the tip of the blades is at least $1.1 \times 10^6$.

19. The wind turbine according to claim 18, wherein the design Reynolds number at the tip of the blades is at least $1.2 \times 10^6$.

20. The wind turbine according to claim 1, wherein the design Reynolds number at the shoulder of the blades is at least $9 \times 10^6$.

21. The wind turbine according to claim 20, wherein the design Reynolds number at the shoulder of the blades is at least $10 \times 10^6$.

* * * * *

UNITED STATES PATENT AND TRADEMARK OFFICE
CERTIFICATE OF CORRECTION

| | | |
|---|---|---|
| PATENT NO. | : 11,852,118 B2 | Page 1 of 1 |
| APPLICATION NO. | : 18/002571 | |
| DATED | : December 26, 2023 | |
| INVENTOR(S) | : Stephen Randall et al. | |

It is certified that error appears in the above-identified patent and that said Letters Patent is hereby corrected as shown below:

In the Claims

Claim 11, Column 11, Line 13, change "according to claim 7" to -- according to claim 9 --.

Signed and Sealed this
Sixteenth Day of July, 2024

Katherine Kelly Vidal
*Director of the United States Patent and Trademark Office*